United States Patent [19]
Kartman

[11] 3,903,439
[45] Sept. 2, 1975

[54] ARRANGEMENT FOR SUPPORTING ROTARY DRUMS

[75] Inventor: Helge Carl Christian Kartman, Copenhagen Valby, Denmark

[73] Assignee: F. L. Smidth & Co., Cresskill, N.J.

[22] Filed: Apr. 1, 1974

[21] Appl. No.: 456,903

[30] Foreign Application Priority Data
Apr. 6, 1973 United Kingdom............... 16622/73

[52] U.S. Cl. ..................... 310/66; 310/90; 241/176
[51] Int. Cl.² ......................................... H02K 7/00
[58] Field of Search ...... 241/DIG. 2, 285, 176, 177, 241/172; 310/90, 40, 112, 66, 67, 91, 89

[56] References Cited
UNITED STATES PATENTS

| | | | |
|---|---|---|---|
| 1,224,933 | 5/1917 | Jordan | 241/176 |
| 1,674,516 | 6/1928 | Lunz | 310/40 R |
| 1,919,489 | 7/1933 | Treschow | 241/176 X |
| 2,781,464 | 2/1957 | Timms | 310/90 |
| 3,136,905 | 6/1964 | Zapf et al. | 310/112 X |
| 3,272,444 | 9/1966 | Rich et al. | 241/176 |

FOREIGN PATENTS OR APPLICATIONS
1,227,768   10/1966   Germany................. 241/176

*Primary Examiner*—Donovan F. Duggan
*Attorney, Agent, or Firm*—Pennie & Edmonds

[57] ABSTRACT

A transmissionless driving arrangement for rotary drums in which at least one support for the drum is constituted by a slide ring which is carried by stationary slideshoes or rollers and surrounds the drum to which it is attached, the rotor and the stator of an electric motor which is utilized for rotatably driving the drum surrounding the body of the drum.

17 Claims, 6 Drawing Figures

ARRANGEMENT FOR SUPPORTING ROTARY DRUMS

BACKGROUND OF THE INVENTION

1. Field of the Invention

The invention relates to a transmissionless driving arrangement for rotary drums.

2. Description of the Prior Art

It is known to drive rotary drums, such as drying drums, tube mills and kilns, by means of slow-running electric motors which without the use of intermediate transmissions surround the drum directly, the rotor for the electric driving motor being mounted around the drum and the stator being arranged stationarily surounding the rotor. The rotor for the electric driving motor is in that case mounted directly around the drum, such as around one of its end flanges. The rotor may be mounted flexibly so as to be able to absorb starting effects or to equalise the ovality which the drum may have, whereas the stator may be mounted on a separate foundation or on a foundation common for the stator and the supports of a trunnion bearing, by which the drum may be guided at one end. U.S. Pat. No. 3,272,444 to Rich et al. illustrates a Gearless Rotary Mill of the type contemplated.

In the prior art it has also been known to mount the rotor outside the trunnion bearing. In such cases the stator and the trunnion bearing have a common foundation.

Tube mills and rotary kilns in particular have in recent years been constructed as units of ever increasing dimensions for very large productions. This has complicated their transportation and erection so much that it is often necessary to transport mills and kilns in several sections for assembly in situ by welding with consequent inaccuracies of the unit after erection. Welded drums have been provided with bearings at the place of erection and then mounted on supports. In such a case, the section of the drum around which the rotor is to be mounted must be machined by means of a portable lathe to prevent the drum from warping in this particular area during its rotation. The subsequent mounting of the rotor on the drum is also a costly and time-consuming operation.

An equivalent disadvantage is that with the very large dimensions of present day units, the heat expansion of the drum is considerable. In particular such expansion in the axial direction results in highly adverse consequences to the electric driving motors as well as to other portions of the system. My invention relates to a transmissionless drum supporting and driving arrangement which eliminates these disadvantages by providing a slide ring to which the rotor is secured, and which provides at least partial support for the rotary drum.

SUMMARY OF THE INVENTION

In accordance with the invention, in a rotary drum having a transmissionless drive, the drum is at least partly supported by a slide ring which is carried by stationary supporting means such as slideshoes or rollers and surrounds the drum to which it is attached, and the drum is driven by an electric ring motor, the rotor and stator of which surround the body of the drum, and the rotor of which is attached to the slide ring and forms a unit with the slide ring while the slide ring is rotatably supported by the supporting means.

By this construction of a transmissionless driving arrangement for a rotary drum, not only are the aforesaid drawbacks almost eliminated, but in addition, substantial advantages are achieved. Thus, when the rotor and the slide ring constitute an assembled unit and are shipped as such, it may be mounted on the drum when the drum sections have been joined by welding and the drum subsequently placed on its foundations. Since the rotor is mounted on the slide ring, machining of the drum is unnecessary as the rotor will always run together with the bearing independently of any ovality of the drum. Time and cost of erection are consequently reduced to a minimum.

Preferably, the support provided by the slide ring and slideshoes or rollers has lateral guides for guiding the slide ring thereon such that axial displacements of the drum do not adversely affect the axial positions of the slide ring and rotor. The lateral guides are preferably on the slideshoes or the rollers. By guiding the slide ring in such a manner the rotor is kept firmly in position in relation to the stationary stator so that heat expansion of the drum will not affect the motor.

In an alternate embodiment, the slide ring with the rotor mounted thereon may be attached to the end flange of the drum. This is used for relatively small units, in which sagging of the drum is not a problem. In the case of large units the slide ring with the rotor mounted thereon is attached directly to the drum. The slide ring to which the rotor is thus fixed may even be welded to the drum so as to form part of the drum. This construction is mainly used for very large units in which the slide ring is mounted between two sections of the drum.

For very large units the rotor and the stator of the motor may each be separately divided into two units which are independent of each other. In this case, the two stator units are arranged with one on each side of the slide ring, and each corresponding to the two rotor units which are also mounted one on each side of the slide ring. This construction may be used where it is convenient for technical reasons to divide the motor into two smaller units. The units may be completely independent of each other, i.e. mechanically as well as electrically, but under certain circumstances it may be advantageous to couple the units electrically.

A common feature in all of the aforesaid modifications is that the slide ring is guided in a permanent position in relation to the stator so that any actions to which it may be subjected do not influence the width of the air gap between rotor and stator. Furthermore, the action to which the motor is subjected by heat radiation from the drum is reduced to a minimum because the rotor is mounted on the side of the slide ring, spaced from the surface of the drum. Further, the protective casing of the stator may be formed such that it provides additional protection against heat radiation from the surface of the drum.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
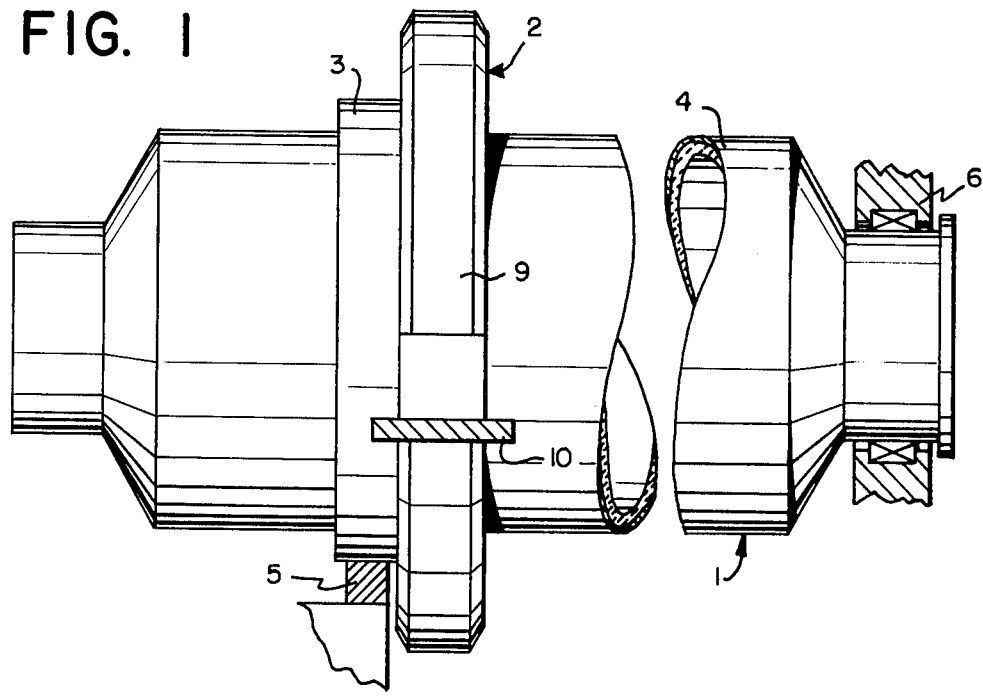
FIG. 1 is a side elevational view, partly in cross-section, of a rotary drum in the form of a mill, illustrating the present invention.
Figure 2:
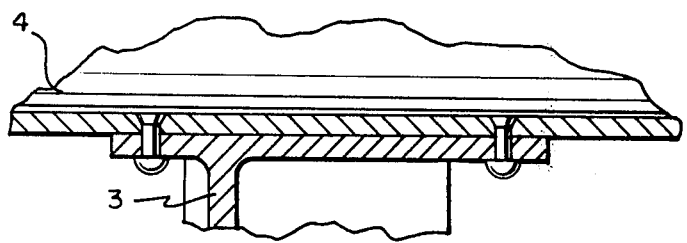
FIG. 2 is a cross-sectional view of the mill of FIG. 1 illustrating a preferred embodiment of the invention.

FIG. 1 shows a rotary tube mill 1 with a ring motor 2 the rotor 7 of which is mounted together with a slide ring 3 on the mill tube 4, and supported by a slideshoe 5 near one end of the mill. At its other end the mill is supported by a trunnion bearing 6. Thus, the mill has only one slide ring serving at the same time for the transmission of driving power and for partial support for the mill. The slide ring 3, on which the rotor 7 of the ring motor 2 is mounted, is bolted or riveted to the mill tube 4 as shown in FIG. 2. Alternately it may be attached by welding it to the mill tube 4 so as to constitute part of the drum as indicated in FIG. 3.

Figure 3:
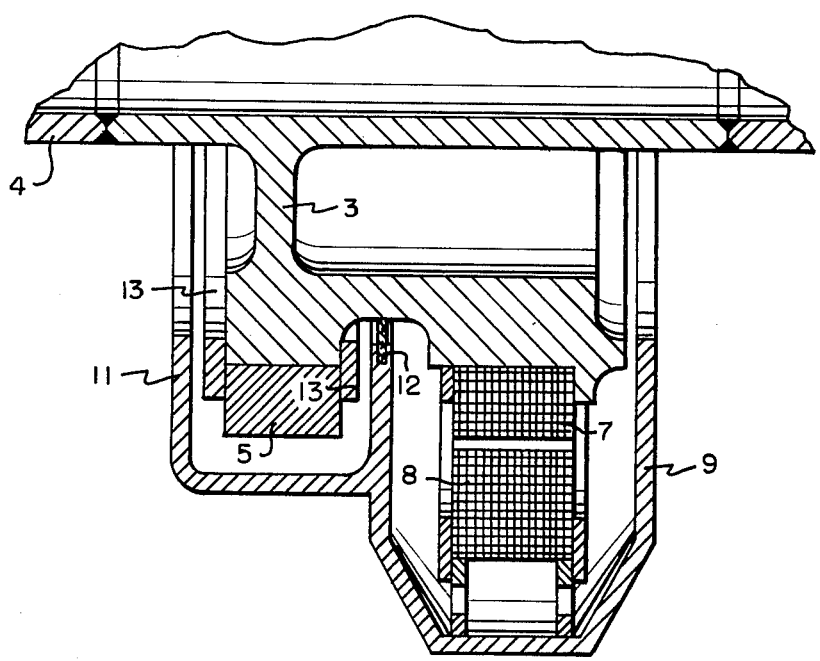
FIG. 3 is a cross-sectional view of the slide ring and ring motor, illustrating an alternate embodiment of the invention.

FIG. 3 shows incidentally a section of the slide ring 3 with the rotor 7 mounted thereon, built together with a stator 8 to form a unit. The stator 8 of the ring motor is enclosed in a stator casing 9 which is stationary on a foundation 10 (see FIG. 1), independent of the support of the mill. The stator casing 9 is further provided with a protective screen 11 for the slide ring 3.

A packing 12 provided on the stator casing 9 provides an oil-tight seal between the slide ring and the motor. The slideshoe bearings 5 are provided with two lateral guides 13 serving to retain the slide ring in a vertical plane in relation to the slideshoe bearings 5, and thereby securing the position of the rotor 7 in relation to the stator 8.

Figure 4:
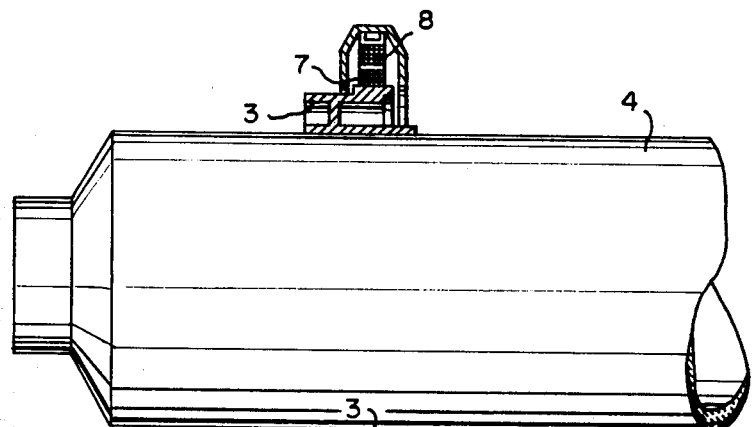
FIG. 4 is an elevational view, partly in cross-section, of a mill with the slide ring mounted on the mill tube.

FIG. 4 shows the slide ring 3 arranged on the mill tube with the rotor 7 of the ring mounted on the side of the slide ring. At the location illustrated, the diameter of the rotor is greater than the diameter of the slide ring, but might also have been smaller than or equal to the latter diameter. The slideshoe bearing 5 is shown in the drawing as being arranged directly beneath the annular connection of the slide ring 3 with the mill tube 4. Alternately the rotor 7 of the ring motor might also have been mounted directly around the annular support of the slide ring 3 on the mill tube; the slideshoe bearing 5 will then be arranged on one side of the rotor.

Figure 5:
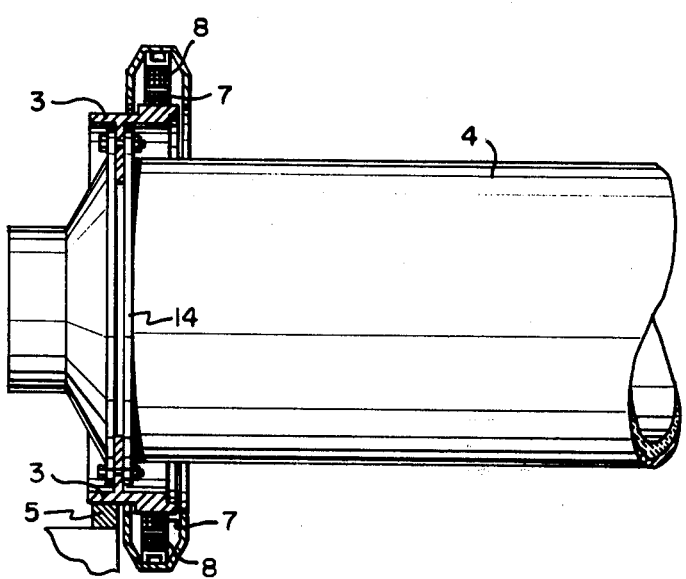
FIG. 5 is an elevational view, partly in cross-section, of a mill illustrating a slide ring mounted on an end flange of the mill.

Referring now to FIG. 5 there is shown the slide ring bolted, riveted or welded to the end flange 14 of the mill tube 4, whereas the slideshoe bearing 5 is arranged as described with reference to, and shown in FIG. 4.

Figure 6:
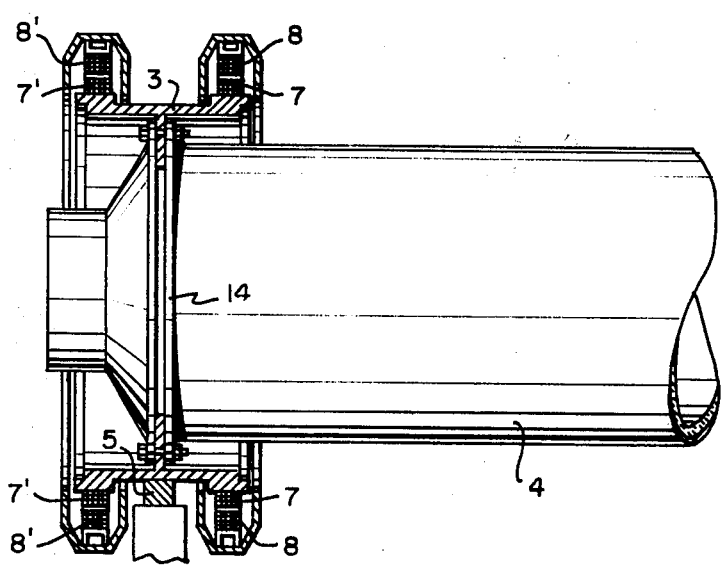
FIG. 6 is an elevational view, partly in cross-section, of a mill illustrating an alternate embodiment in which the ring motor is divided into two units.

FIG. 6 shows likewise a slide ring 3, bolted, riveted or welded to the end flange 14 of the mill tube 4. The slideshoe bearing is arranged as described above, whereas the ring motor is constructed of two independent units. The rotors 7 and 7' are mounted one on each side of the slide ring 3, whereas the stators 8 and 8' are stationary, and mounted on each side of the live ring. The design with a double ring motor with a live ring may also be built together with the mill as indicated in FIG. 4, which shows a ring motor with a single stator and rotor.

During operation the slide ring and consequently the rotor of the ring motor are retained securely in their position by the lateral guides so that the rotor cannot be displaced in the longitudinal (axial) direction of the mill. As a result, the rotor and the stator are not displaced in relation to each other, even though the position of the mill tube is changed during operation owing to heat expansions or deformations. This affords the additional advantage of minimum loss of motor efficiency. As a further advantage resulting from arranging the rotor on the slide ring as shown in the drawings, the air gap at the lower part of the motor is maintained unaltered, even though the mill tube expands radially, for example, such as is common with heat expansions. The mill may also be constructed such that the air gap at the upper part of the motor is maintained at a specific value corresponding to the anticipated or expected heat expansion. As a result of such a design the air gap may also be reduced in size as compared with the known designs. This results in vast improvements in the operation of the motor.

The motors may in a manner known per se be provided with speed regulators of various design, thus permitting regulation of the drum speed within a suitable range.

I claim:

1. An arrangement for rotating and at least partially supporting a rotary drum comprising a slide ring surrounding said drum and secured thereto, means for rotatably supporting the slide ring, an electrically driven ring motor having at least one rotor and stator surrounding the drum, said rotor being secured to the slide ring such that rotation of the rotor causes the slide ring and the drum to rotate while the slide ring is rotatably supported by the supporting means, and laterally positioned guide means configured and positioned to maintain the contacting relation between the slide ring and the supporting means such that axial displacements of drum portions do not affect the relative axial positions of the stator and rotor.

2. The arrangement for rotating and at least partially supporting a rotary drum according to claim 1 wherein said means for rotatably supporting the slide ring comprises at least one stationary slide shoe.

3. The arrangement for rotating and at least partially supporting a rotary drum according to claim 1 wherein said means for rotatably supporting the slide ring comprises roller means.

4. The arrangement according to claim 2 wherein the rotary drum includes at least one end flange with means for securing the slide ring with the rotor mounted thereon to said end flange.

5. The arrangement according to claim 3 wherein the rotary drum includes at least one end flange with means for securing the slide ring with the rotor mounted thereon to said end flange.

6. The arrangement according to claim 2 further comprising means for securing the slide ring with the rotor mounted thereon, directly to said drum.

7. The arrangement according to claim 3 further comprising means for securing the slide ring with the rotor mounted thereon, directly to said drum.

8. The arrangement according to claim 2 wherein the slide ring, with the rotor mounted thereon, is securely affixed to said drum by a fusion weld.

9. The arrangement according to claim 3 wherein the slide ring, with the rotor mounted thereon, is securely affixed to said drum by a fusion weld.

10. The arrangement according to claim 2 further comprising a casing which is configured and positioned to at least enclose the ring motor and to provide an oil-tight seal between the slide ring and the motor.

11. The arrangement according to claim 3 further comprising a casing which is configured and positioned to at least enclose the ring motor and to provide an oil-tight seal between the slide ring and the motor.

12. The arrangement according to claim 10 further comprising a protective screen for said slide ring.

13. The arrangement according to claim 11 further comprising a protective screen for said slide ring.

14. The arrangement according to claim 2 in which the rotor and the stator of the driving arrangement are each divided into two units, said units being independent of each other, the two stator units being positioned with one on each side of the slide ring, and the two rotor units being attached to the slide ring with one rotor on each side of the slide ring.

15. The arrangement according to claim 3 in which the rotor and the stator of the driving arrangement are each divided into two units, said units being independent of each other, the two stator units being positioned with one on each side of the slide ring, and the two rotor units being attached to the slide ring with one rotor on each side of the slide ring.

16. The arrangement according to claim 14 further comprising a separate casing for each ring motor, said casings being configured and positioned to enclose each motor.

17. The arrangement according to claim 15 further comprising a separate casing for each ring motor, said casings being configured and positioned to enclose each motor.

* * * * *